US011553705B2

(12) United States Patent
Bittner

(10) Patent No.: US 11,553,705 B2
(45) Date of Patent: Jan. 17, 2023

(54) AGRICULTURAL VEHICLE HAVING AN IMPROVED APPLICATION BOOM FOR MOUNTING ATTACHMENTS

(71) Applicant: CNH Industrial America LLC, New Holland, PA (US)

(72) Inventor: Roy A. Bittner, Cato, WI (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 455 days.

(21) Appl. No.: 16/546,943

(22) Filed: Aug. 21, 2019

(65) Prior Publication Data

US 2021/0051943 A1 Feb. 25, 2021

(51) Int. Cl.
| | | |
|---|---|---|
| A01M 7/00 | (2006.01) | |
| B05B 15/65 | (2018.01) | |
| A01C 23/04 | (2006.01) | |
| B05B 12/00 | (2018.01) | |
| B05B 1/20 | (2006.01) | |
| A01M 21/04 | (2006.01) | |

(52) U.S. Cl.
CPC ......... *A01M 7/0075* (2013.01); *A01C 23/047* (2013.01); *A01M 21/043* (2013.01); *B05B 1/202* (2013.01); *B05B 12/004* (2013.01); *B05B 15/65* (2018.02)

(58) Field of Classification Search
CPC .. A01M 7/0075; A01M 21/043; A01M 7/006; A01M 7/0074; F16L 3/1033; F16L 37/045; A01C 23/047; B05B 15/65; B05B 1/202; B05B 12/004
See application file for complete search history.

(56) References Cited

U.S. PATENT DOCUMENTS

| | | | | | |
|---|---|---|---|---|---|
| 2,301,213 | A | * | 11/1942 | Kang | A01M 7/005 239/162 |
| 3,158,324 | A | * | 11/1964 | Oehler | A01M 7/005 239/164 |

(Continued)

FOREIGN PATENT DOCUMENTS

WO 2013132383 A1 9/2013

OTHER PUBLICATIONS

DX DealExtreme; "Weaver Rail Scope Mount Base Adapter"; https://www.dx.com/p/y0012-aluminum-alloy-11mm-to-22mm-weaver-rail-scope-mount-base-adapter-black-2025197#.XSYTb-TsYW-; date Apr. 15, 2019; (1) page.

(Continued)

*Primary Examiner* — Joseph A Greenlund
(74) *Attorney, Agent, or Firm* — Rebecca Henkel; Rickard Demille

(57) ABSTRACT

An agricultural vehicle includes a chassis, wheels supporting the chassis for moving the vehicle, an application boom coupled to the chassis and configured to deliver agricultural product to an agricultural field. The application boom has a boom arm including a longitudinal mount. In embodiments, the longitudinal mount includes a first projection, a second multi-lip projection, and a third projection. The second multi-lip projection has a first lip and a second lip. The agricultural vehicle further includes a first mounted attachment fastened to the first projection and the first lip of the second projection, and a second mounted attachment fastened to the second lip of the second projection and the third projection.

10 Claims, 10 Drawing Sheets

(56) References Cited

U.S. PATENT DOCUMENTS

| | | | | |
|---|---|---|---|---|
| 3,887,129 | A * | 6/1975 | Brown | B64D 1/18 |
| | | | | 239/164 |
| 4,350,294 | A * | 9/1982 | Gaspard | A01M 7/005 |
| | | | | 239/169 |
| 4,641,781 | A * | 2/1987 | McCrea | A01M 7/0064 |
| | | | | 47/1.7 |
| 5,097,798 | A * | 3/1992 | Little | A01K 39/02 |
| | | | | 248/58 |
| 5,106,050 | A | 4/1992 | Vaccaro et al. | |
| 5,230,302 | A * | 7/1993 | Steudler, Jr. | A01K 39/02 |
| | | | | 248/58 |
| 5,516,044 | A * | 5/1996 | Thorstensson | A01M 7/0042 |
| | | | | 239/176 |
| 5,862,987 | A * | 1/1999 | Reif | B05B 1/202 |
| | | | | 248/58 |
| 5,927,041 | A * | 7/1999 | Sedlmeier | E04B 9/064 |
| | | | | 52/39 |
| 5,971,295 | A * | 10/1999 | Jensen | A01M 7/0075 |
| | | | | 239/587.5 |
| 6,000,187 | A | 12/1999 | Shimizu | |
| 6,053,427 | A * | 4/2000 | Wilger | B05B 15/658 |
| | | | | 285/305 |
| 6,837,446 | B1 * | 1/2005 | Jesse | A01M 7/006 |
| | | | | 239/161 |
| 7,066,402 | B2 * | 6/2006 | Goebel | A01M 7/006 |
| | | | | 239/444 |
| 7,828,251 | B2 * | 11/2010 | Tollefson | E04C 5/20 |
| | | | | 248/68.1 |
| 8,056,828 | B1 * | 11/2011 | Kline | A01C 17/006 |
| | | | | 239/147 |
| 8,894,022 | B2 | 11/2014 | Chirpich et al. | |
| 8,985,532 | B2 * | 3/2015 | Chirpich | A01M 7/0053 |
| | | | | 248/68.1 |
| 9,453,592 | B2 * | 9/2016 | Zhang | F16L 3/1033 |
| D771,232 | S | 11/2016 | Coon | |
| 9,790,980 | B2 * | 10/2017 | McCarthy | F16B 37/045 |
| 9,807,997 | B2 | 11/2017 | Hiddema et al. | |
| 10,433,535 | B2 * | 10/2019 | Hiddema | A01M 7/0071 |
| 10,662,650 | B2 * | 5/2020 | Lacroix | E04C 3/06 |
| 10,994,290 | B2 * | 5/2021 | Bittner | A01G 25/09 |
| 11,154,045 | B2 * | 10/2021 | Hiddema | A01M 7/0075 |
| 2002/0024665 | A1 * | 2/2002 | Masten | G01N 21/31 |
| | | | | 356/328 |
| 2002/0122691 | A1 * | 9/2002 | Wood | F16B 5/0685 |
| | | | | 403/381 |
| 2005/0017103 | A1 * | 1/2005 | Goebel | B05B 1/14 |
| | | | | 239/722 |
| 2007/0211462 | A1 | 9/2007 | Dowell et al. | |
| 2008/0179429 | A1 * | 7/2008 | Beilke | A01M 7/006 |
| | | | | 239/589 |
| 2010/0147901 | A1 * | 6/2010 | Larsson | B67D 7/0478 |
| | | | | 285/82 |
| 2012/0132730 | A1 * | 5/2012 | Peterson | A01M 7/006 |
| | | | | 239/738 |
| 2013/0235558 | A1 | 9/2013 | Zhou | |
| 2014/0097304 | A1 | 4/2014 | Mastro | |
| 2014/0260083 | A1 * | 9/2014 | Zhang | H02G 3/0437 |
| | | | | 52/843 |
| 2014/0283481 | A1 * | 9/2014 | Zhang | H02G 3/0437 |
| | | | | 52/843 |
| 2015/0367358 | A1 * | 12/2015 | Funseth | A01M 7/0089 |
| | | | | 239/562 |
| 2016/0120117 | A1 * | 5/2016 | Lawrence | A01C 23/006 |
| | | | | 239/164 |
| 2016/0262371 | A1 | 9/2016 | Hiddema et al. | |
| 2017/0216871 | A1 * | 8/2017 | Klemp, Jr. | B05B 15/628 |
| 2017/0354137 | A1 * | 12/2017 | Dahlhauser | A01M 7/0064 |
| 2018/0243771 | A1 * | 8/2018 | Davis | A01B 63/008 |
| 2019/0075778 | A1 * | 3/2019 | Barker | A01M 7/006 |
| 2019/0311197 | A1 * | 10/2019 | Zemenchik | G06T 7/11 |
| 2020/0085031 | A1 * | 3/2020 | Lasne | A01M 7/0082 |
| 2020/0179969 | A1 * | 6/2020 | Lasne | A01M 7/006 |
| 2020/0281183 | A1 * | 9/2020 | Klemme | A01M 7/0053 |
| 2020/0298260 | A1 * | 9/2020 | Bittner | B05B 9/007 |
| 2021/0051938 | A1 * | 2/2021 | Bittner | A01M 7/006 |
| 2021/0051943 | A1 * | 2/2021 | Bittner | A01C 23/047 |
| 2021/0301962 | A1 * | 9/2021 | Kesselaar | F16L 3/227 |

OTHER PUBLICATIONS

PA PyramydAir; "UTG Law Enforcement Rated Double Rail"; https://www.pyramydair.com/s/a/UTG_Law_Enforcement_Rated_Double_Rail_3_Slot_Weaver_Picatinny_Angle_Mount_Integral_Quick_Detach_Lever_Lock_System/4715; date Apr. 15, 2019; (2) pages.

* cited by examiner

AGRICULTURAL VEHICLE HAVING AN IMPROVED APPLICATION BOOM FOR MOUNTING ATTACHMENTS

FIELD OF THE INVENTION

The invention relates generally to agricultural machines having agricultural product application equipment and, in particular, to an agricultural vehicle including an improved application boom mount for supporting an application system and attachments.

BACKGROUND OF THE INVENTION

Various types of agricultural vehicles (e.g., sprayers, floaters, applicators, collectively referred to herein as applicators) are employed to deliver fertilizer, pesticides, herbicides, or other products to the surface of a field. Such agricultural vehicles typically include an application boom configured to facilitate product delivery over wide swaths of soil.

Modern sprayers are increasingly controlling the spray pattern on an individual nozzle basis, thereby increasing the amount of control to each nozzle. Exemplary attachments for assisting the application system can include nozzle clamps, radar units, sonic sensors, smart sensors, and cameras. Additional attachments are being developed over time to replace old technology. For example, radar units are replacing sonic sensors to help determine boom height. It would be beneficial to have a simpler way of adding and removing attachments to the boom. It would also be beneficial to allow for a simpler way to remove and add attachments of differing sizes and weights.

SUMMARY OF THE INVENTION

According to aspects of the invention, an agricultural vehicle includes an application arm with a longitudinal truss member. The longitude truss member has a multi-lip rail. The multi-lip rail can be included as an attachment to the longitudinal truss member or can be integrated or formed with the longitudinal truss member. The multi-lip rail receives clamps of varying design and size. The clamps mount attachments to the multi-lip rail, and more broadly, the application arm.

According to one aspect of the invention, an agricultural vehicle includes a chassis, wheels supporting the chassis for moving the vehicle, and an application boom coupled to the chassis and configured to deliver agricultural product to an agricultural field. The application boom having a boom arm including a longitudinal mount. The longitudinal mount including a base projection, a first projection, and a second projection. The agricultural vehicle further includes an application system and an attachment mounted to the base projection and the first projection. The application system has a product tank supported by the chassis and storing a volume of the agricultural product for delivery onto an agricultural field, a nozzle body mounted to the base projection and the second projection, and a piping system for delivering the agricultural product to the nozzle body.

According to another aspect of the invention, an agricultural vehicle includes a chassis, wheels supporting the chassis for moving the vehicle, an application boom coupled to the chassis and configured to deliver agricultural product to an agricultural field. The application boom has a boom arm including a longitudinal mount. The longitudinal mount includes a first projection, a second multi-lip projection, and a third projection. The second multi-lip projection has a first lip and a second lip. The agricultural vehicle further includes a first mounted attachment fastened to the first projection and the first lip of the second projection, and a second mounted attachment fastened to the second lip of the second projection and the third projection.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
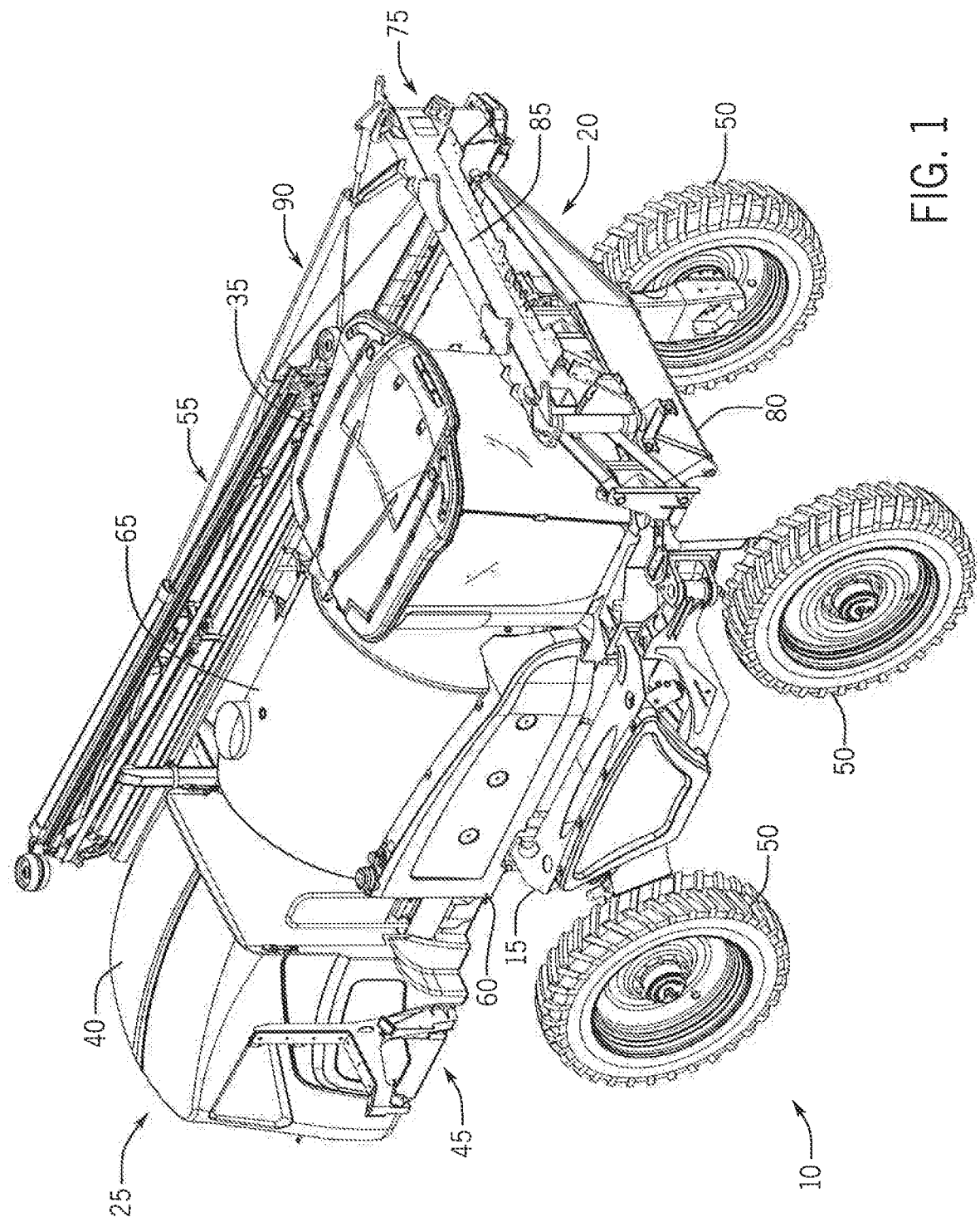
FIG. 1 is an isometric view of a front-boom sprayer from a first perspective, where the boom is in a raised position, and the left boom arm is in a retracted position.

Referring now to the drawings and specifically to FIGS. 1-4, aspects of the invention are shown for use with an agricultural vehicle, which is shown in the figures to be an agricultural sprayer vehicle (referred to herein as simply a "sprayer") 10. The sprayer 10 is shown as a front-boom sprayer, such as those available from CNH Industrial, including the Miller Nitro sprayers and New Holland Guardian Series sprayers. Other arrangements for the sprayer 10 are contemplated, including a rear-mounted configuration boom sprayer, such as those available from CNH Industrial, including the Miller Condor Series sprayers and New Holland Guardian Series rear-boom sprayers. Moreover, other agriculture machines and vehicles incorporating aspects of the invention are contemplated, including agriculture vehicles having a boom.

The sprayer 10 includes a frame or chassis 15 having front and back ends 20 and 25, respectively. The chassis 15 provides structural support for various assemblies, systems, and components of the sprayer 10. These various assemblies, systems, and components can include an operator cab 35 in a forward position toward the front end 20 of the chassis 15. An engine 40 and a hydraulic system 45 are shown in a rearward position toward the back end 25 of the chassis 15. The hydraulic system 45 receives power from the engine 40 and includes at least one hydraulic pump which can be in a hydrostat arrangement. The hydraulic pump(s) provide hydraulic pressure for operating hydraulic components within the hydraulic system 45. For sprayers with hydrostatic drives, hydraulic motors are operably connected to the hydraulic pump(s) for rotating wheels 50 of the sprayer 10. In mechanical drive applications, a mechanical transmission receives power from the engine 40 and delivers power for rotating the wheels 50 by way of power-transmitting driveline components. Example power-transmitting driveline components include drive shafts, differentials, and other gear sets in portal, drop boxes, or other housings.

Figure 5:
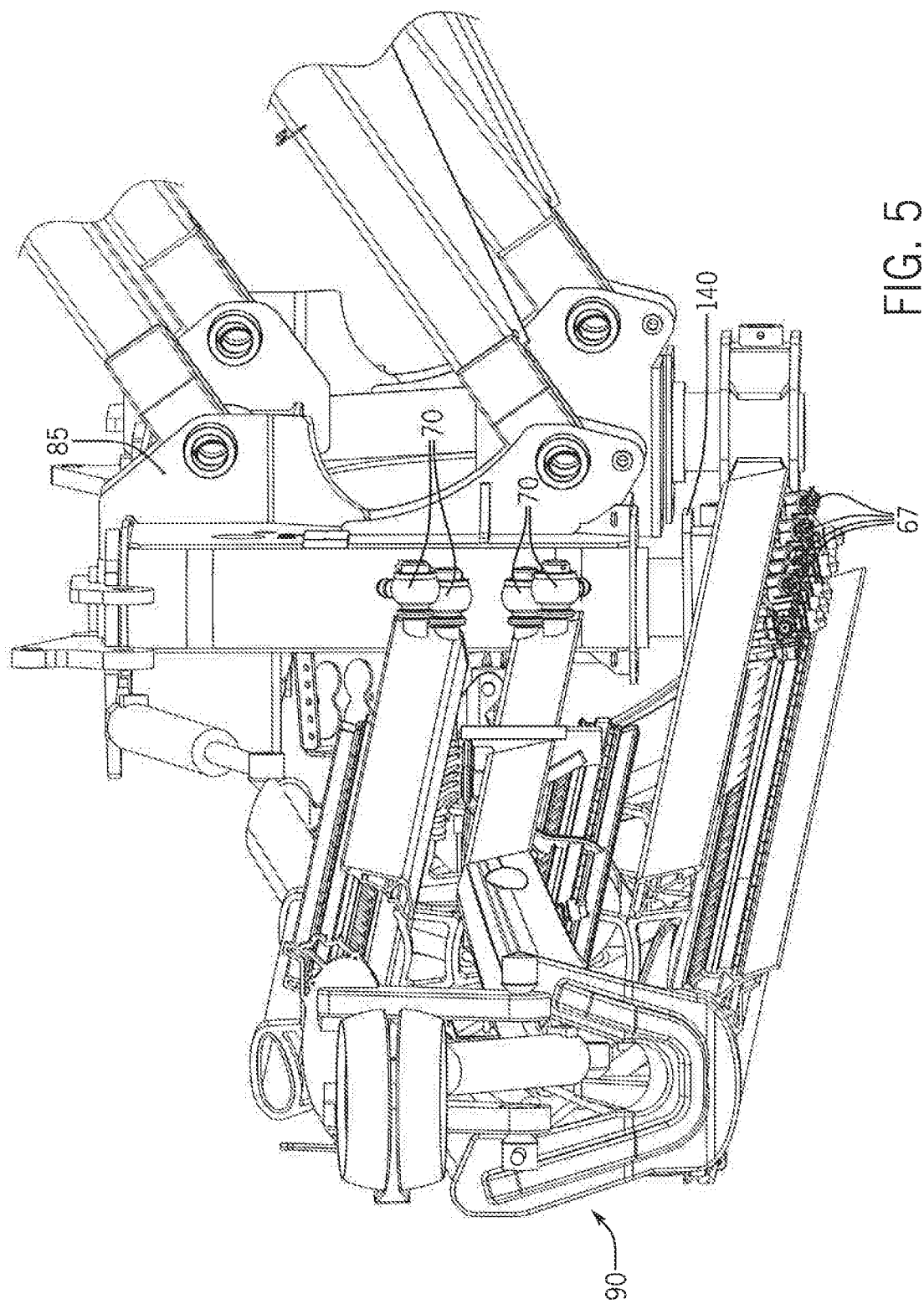
FIG. 5 is an enlarged isometric view of a portion of the left boom arm of FIG. 4.

A spray-application system 55 is supported by the chassis 15. The spray-application system 55 includes storage containers, such as a rinse tank 60 for storing water or a rinsing solution and a product tank 65 for storing a volume of product for delivery onto an agricultural field with the sprayer 10. The product includes any of a variety of agricultural liquid products, such as various pesticides, herbicides, fungicides, liquid fertilizers, and other liquids including liquid suspensions beneficial for application onto agricultural fields. A product delivery pump can convey product from the product tank 65 through plumbing components to nozzle bodies 67 (FIG. 5). The plumbing components includes a piping system 70 (FIG. 5) for transport of the product. The nozzle bodies 67 are spaced from each other along the width of an application boom (simply referred to as boom 75 herein) during spraying operations of the sprayer 10. To simplify the figures, only a small number of the nozzle bodies 67 are shown and not all of the piping system 70 is shown. One skilled in the art will know to extrapolate and expand the number of nozzle bodies and piping system as necessary. Groups or banks of multiple adjacent nozzle bodies define multiple spray segments of the spray system. Spray segments are defined along the boom 75 and selectively deliver product for release onto an agricultural field at locations corresponding to positions of activated spray segments.

Figure 2:
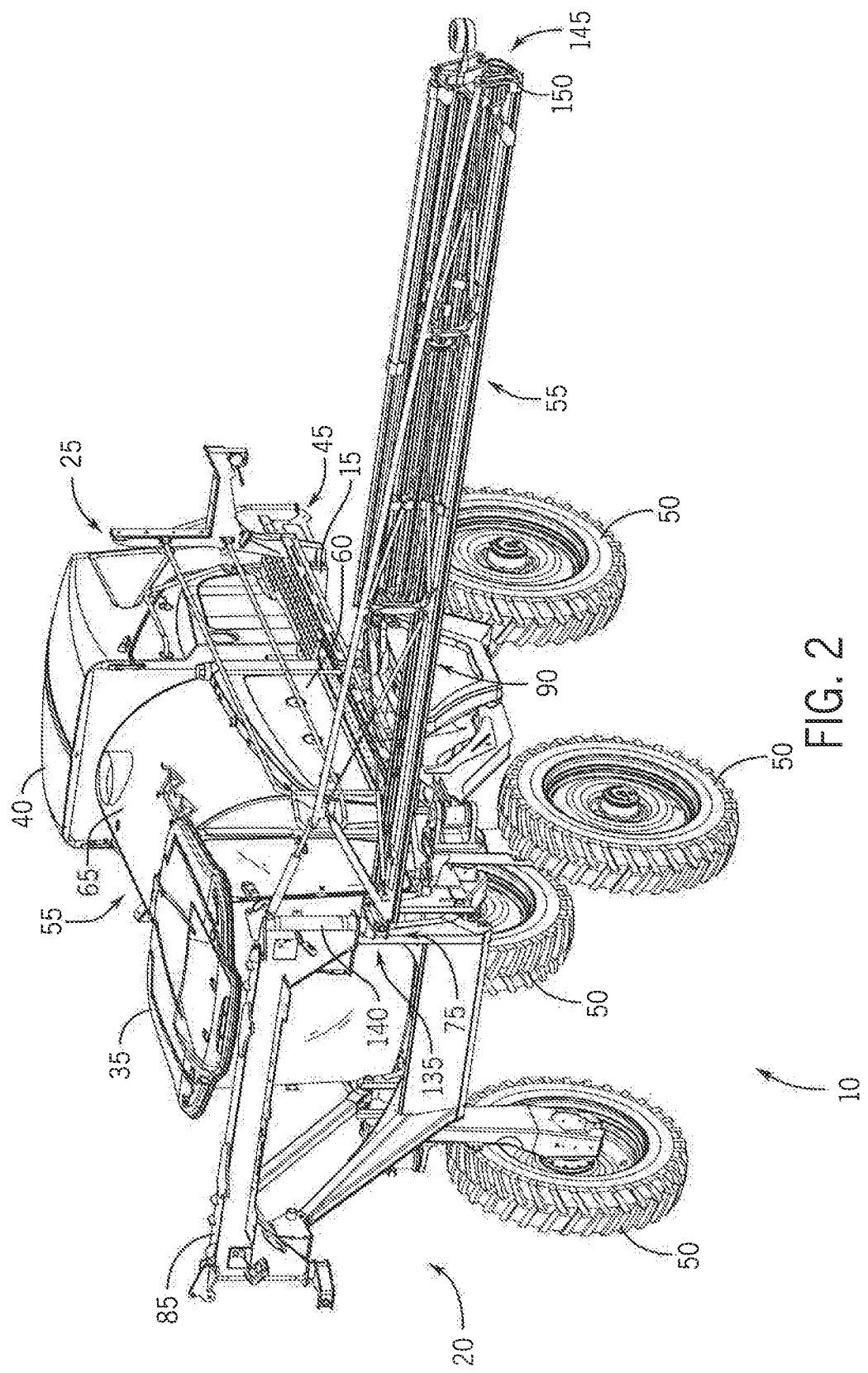
FIG. 2 is an isometric view from a second perspective of the front-boom sprayer of FIG. 1, where the boom is in a raised position, the right boom arm is removed, a first boom arm segment of the left boom arm is in an extended positioned, and second and third boom arm segments of the left boom arm are in the retracted position.

The boom 75 is connected to the chassis 15 with a lift arm arrangement or assembly 80. The lift arm assembly 80 is attached to a boom center section 85. The lift arm assembly 80 is configured to move the boom 75 up and down for adjusting the height of application of the product and/or to raise the boom 75 above objects (e.g., agricultural product). FIGS. 1 and 2 show the boom in a raised position, and FIGS. 3 and 4 show the boom in a lowered position.

Coupled to the boom center section 85, the boom 75 has multiple interconnected segments that collectively define each of a left and right boom arm, respectively. Left and right for the boom 85 are defined with respect to an operator's view of the boom 75 from the operator cab 35. Left and right boom arms extend in opposite directions from the boom center section 85. The left and right boom arms are mirror identical about a longitudinal axis of the sprayer 10, and thus, only left boom arm 90 is shown and described in further detail. For simplicity, FIGS. 1-4 show the right boom arm removed. FIG. 1 shows the left boom arm 90 in a retracted, or transport, position, FIGS. 2-4 show the left boom arm 90 in an extended position.

The left boom arm 90 has multiple segments, including first, second, and third boom arm segments 100, 105, and 110 (FIG. 4), respectively. The number of boom arm segments can vary among sprayer designs. Collectively, the boom center section 85, the left boom arm 90, and the right boom arm define the boom 75, which has left and right ends, respectively. The boom 75 has an inner facing or inward side 125 that faces toward the operator cab 35 and provides a vehicle mounting surface(s) with mounting structures configured for mounting the boom 75 to the lift arm assembly 80. Opposite the inner facing side 125 is an outer facing or outward side 130 of the boom 75 that faces away from the operator cab 35.

Figure 3:
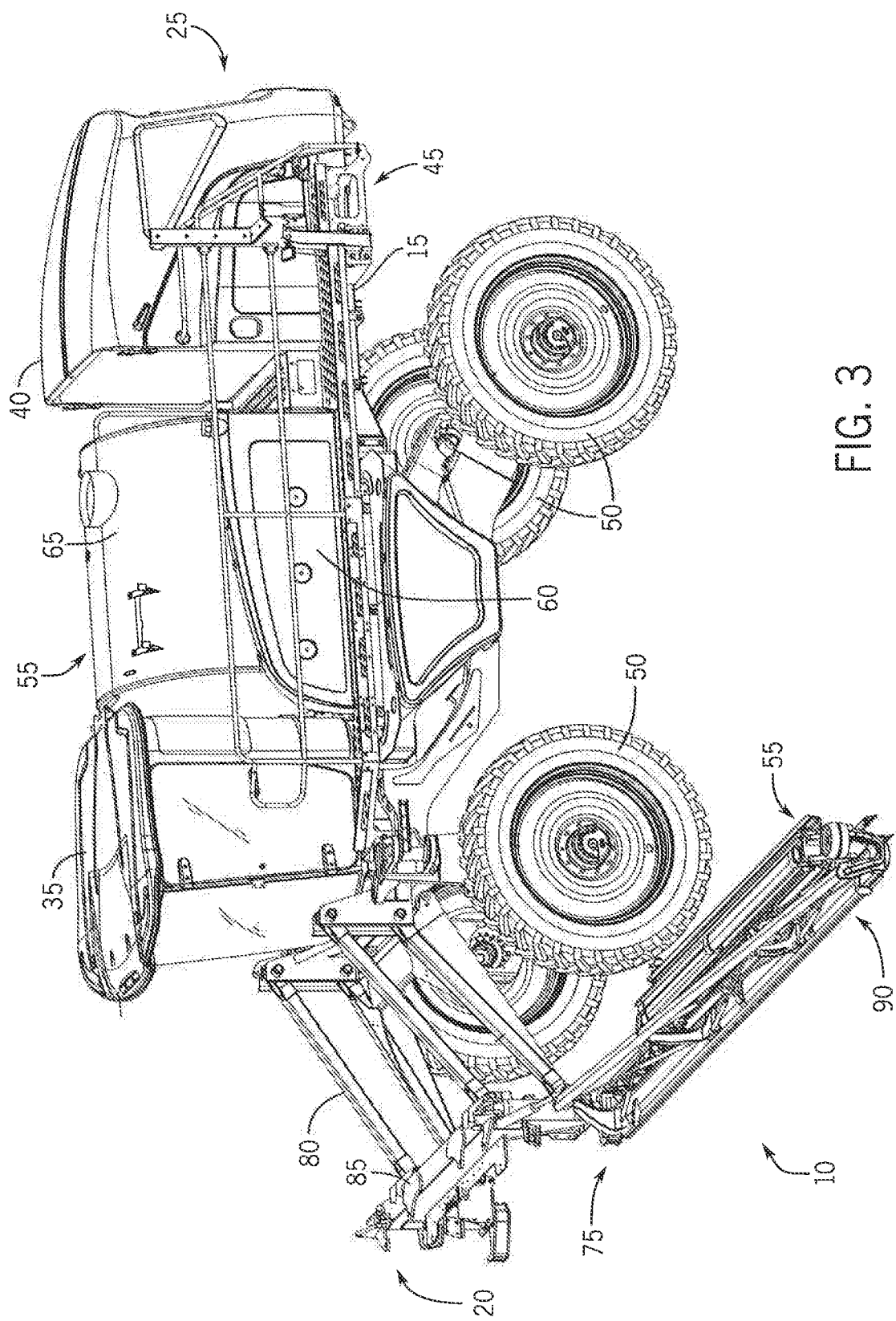
FIG. 3 is an isometric view from the second perspective of the front-boom sprayer of FIG. 1, where the boom is in a lowered position, the right boom arm is removed, the first boom arm segment of the left boom arm is in the extended positioned, and the second and third boom arm segments of the left boom arm are in the retracted position.
Figure 4:
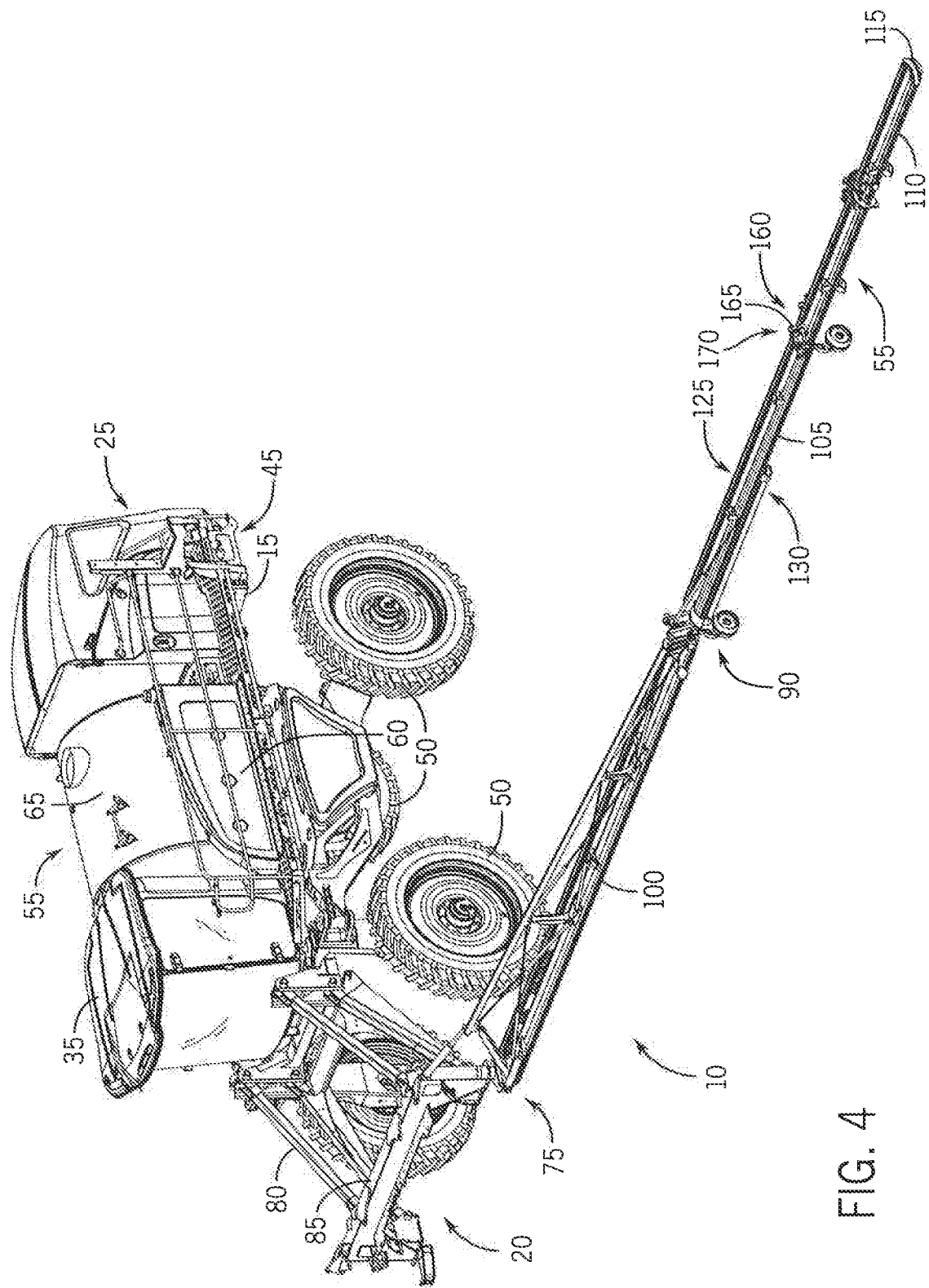
FIG. 4 is an isometric view from the second perspective of the front-boom sprayer of FIG. 1, where the boom is in the lowered position, the right boom arm is removed, and the left boom arm is in a fully extended position.

FIGS. 2 and 3 show the left boom arm 90 in a first extended, spray position, where only the first segment 100 of the left boom arm 90 is extended. Moreover, FIG. 2 shows the left boom arm 90 at a first spray height and FIG. 3 shows the left boom arm at a second spray height. FIG. 4 shows the left boom arm in a second extended, spray position, where all of the first, second, and third segments 1100-110 are extended. The boom center segment and/or the first, second, and third boom arm segments 100-110 are configured with actuators to allow the left boom arm 90 to fold and extend as necessary for operation.

With reference to FIG. 2, the first boom arm segment 100 has an inner end 135 that is connected with hinge 140 to the boom center section 85. The hinge 140 is configured to allow for generally forward/rearward horizontal pivoting of the first boom arm segment 100, and consequently second and third boom arm segments 105 and 110, away/toward the chassis 15 when pivoting the first boom arm segment 100.

The second boom arm segment 105 has an inner end 145 that is connected with hinge 150 to the outer end 155 of the first boom arm segment 100. The hinge 150 is configured to allow for generally rotating the second boom ami segment 105, and consequently third boom arm segment 110, away/toward the first boom arm segment 100 when pivoting the second boom arm segment 105.

With reference to FIG. 4, the third boom arm segment 110 has an inner end 160 that is connected with hinge 165 to the outer end 170 of the second boom arm segment 100. The hinge 165 is configured to allow for generally rotating the third boom arm segment 110 away/toward the second boom arm segment 105 when pivoting the third boom arm segment 110.

The first boom arm segment 100 has a truss arrangement. Included with the truss arrangement is a longitudinal tube 175 (FIG. 6), which is one example of a tube in the truss arrangement. FIG. 4 shows the left boom arm having multiple longitudinal tubes. Aspects of the invention are discussed in connection with the longitudinal tube 175, but can be used in many other tube arrangements.

Figure 6:
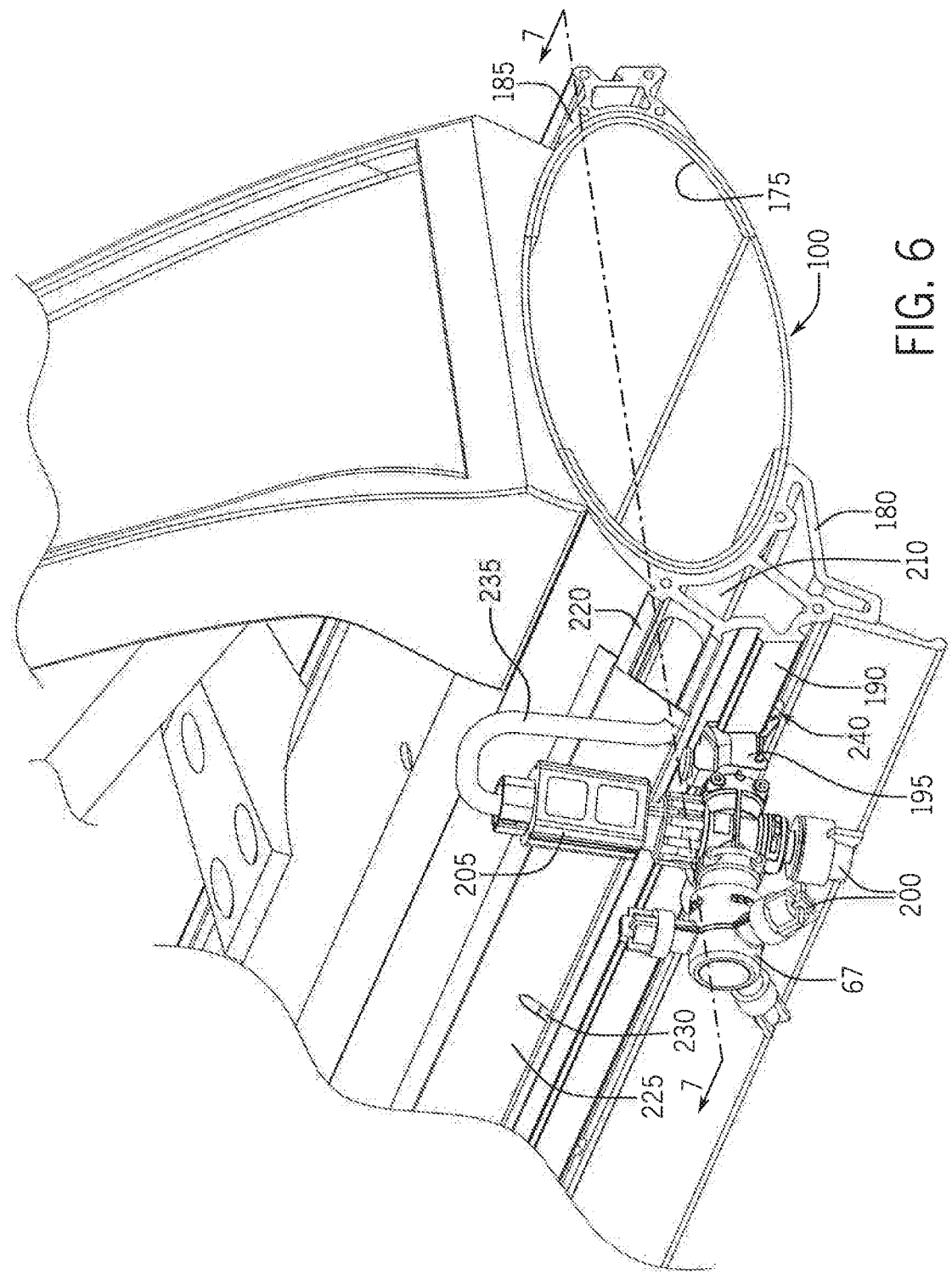
FIG. 6 is an enlarged isometric view of a portion of the left boom arm of FIG. 4.
Figure 7:
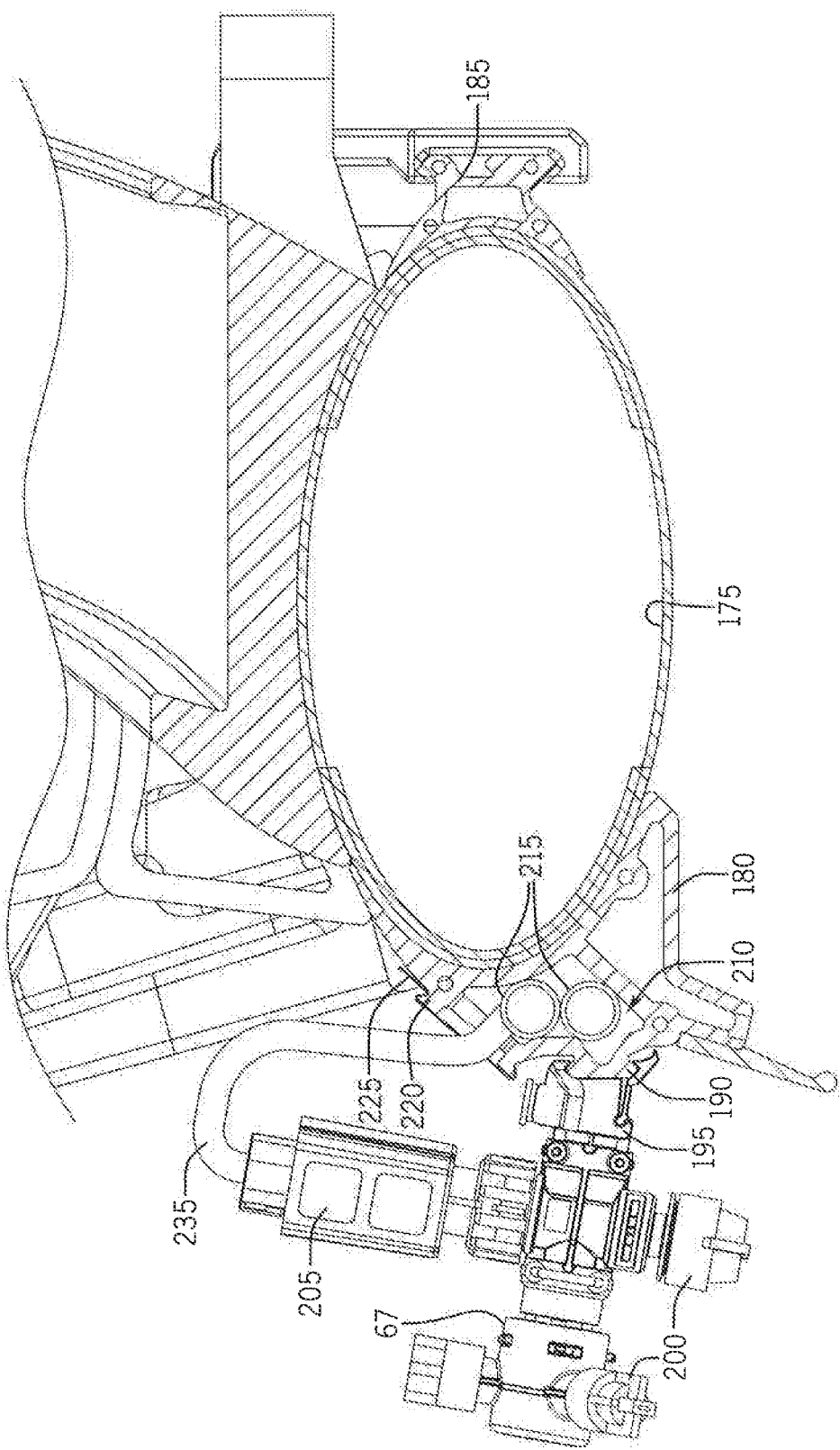
FIG. 7 is a cross sectional view of a portion of the left boom arm in FIG. 4.

FIG. 5 is an enlarged view of the left boom arm 90 coupled with the boom center section 85 via the hinge 140. FIG. 6 shows a portion of the first boom arm segment 100 with one nozzle body 67. FIG. 7 shows a sectional view of the first boom arm segment 100. The longitudinal tube 175 is coupled to first and second extrusions 180 and 185, respectively. As shown in the figures, the first extrusion 180 acts as a chase for pipes, tubes, and/or control lines. As application booms get larger, alternate structural materials to metal (e.g., steel) become more attractive, due to the altering relationships between costs, weight, and stress characteristics. Composite materials like carbon fiber (CF) can carry distributed loads well. The shown longitudinal tube 175 is a composite material such as CF. Also as shown, the longitudinal tube 175 has an elliptical or oblong cross section.

CF tubes are great for torsion and good in bending, but are vulnerable to buckling and can crush on impact. Another material, such as aluminum, coupled to the CF tube can help. Extruding is an affordable method of constructing aluminum parts. The first and second extrusions 180 and 185 could be made of formed steel, plastic, or extruded aluminum. The first and second extrusions 180 and 185 could also be integral to the structure or added on.

The first and second extrusions 180 and 185 can comprise of a different material from the CF tube 175. For example, the first and second extrusions 180 and 185 can consist of extruded aluminum, but other materials are possible. The following benefits can occur by adding bonded aluminum strips.

Protect against damage from collisions or light impacts.
Reinforce CF tubes in areas of compressive loads (control buckling of thin walls).
Provide mounting points for attachments (reduce stress risers from unnecessary holes).
Shaped to control air flow (or not produce turbulence).

The shown first extrusion 180 includes a first rail 190 for clipping nozzles bodies 67 or other attachments to the application boom 75. For the construction shown, the nozzle bodies 67 include clamp 195 for attachment to the first extrusion 180, spray nozzles 200 for applying the agricultural product, and a controller 205 for controlling the nozzle bodies 67. The shown construction is a multi-sprayer nozzle with an electrical controller for controlling the nozzle body. However, the sprayer 10 is not limited to the multi-sprayer nozzle shown. Other nozzle bodies are possible including a nozzle body having a single sprayer and/car hydraulically controlled sprayers with a hydraulic controller.

The first extrusion 180 or chase includes a channel 210 for routing control lines 215 (electrical or hydraulic) along the length of the first boom arm segment 100. The first extrusion 180 includes a second rail 220. The second rail 220 is used for attaching a. cap 225 or cover having openings, such as slots 230 or apertures. The channel 210 and cap 225 retain control lines, keeping them safe. The cap 225 provides a cover for the channel 210 to help keep moisture and dirt out of the channel 210. The slots 230 provide openings for control lines branches 235 to exit from the channels 210 to the controllers 205. Being placed close to the nozzle bodies 67 and with ports, the control line branches 235 are short and don't need clamps or ties. Lying loose in the channels 210, the main lines 215 are also not confined by clamps and ties, reducing the risk of chaffing, and via the snap on cap 225 or cover, they can be lifted in and out individually for quick assembly and service.

Figure 9:
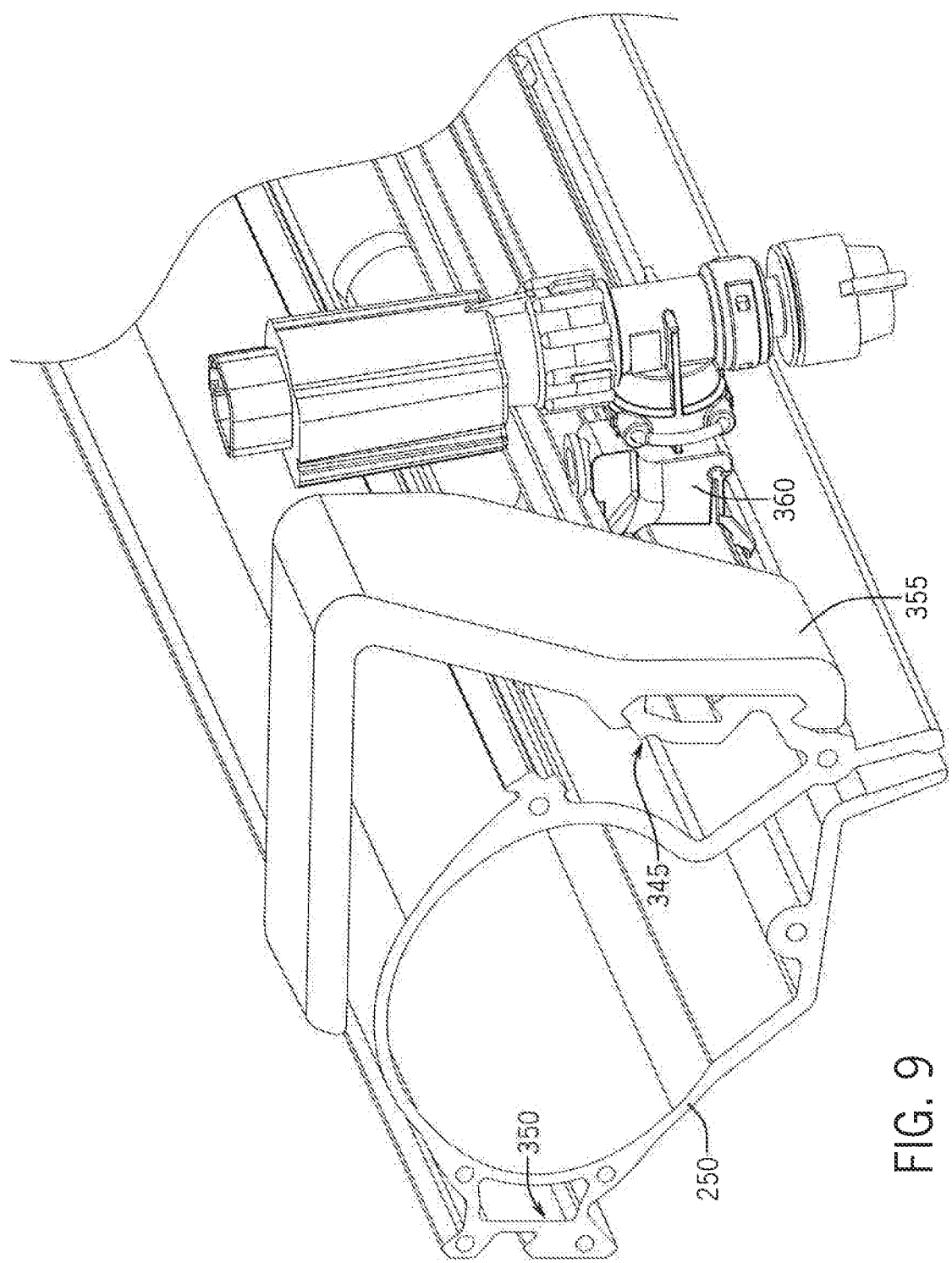
FIG. 9 is an enlarged isometric view of a boom arm having a plurality of accessories mounted to the front of the left boom arm.
Figure 10:
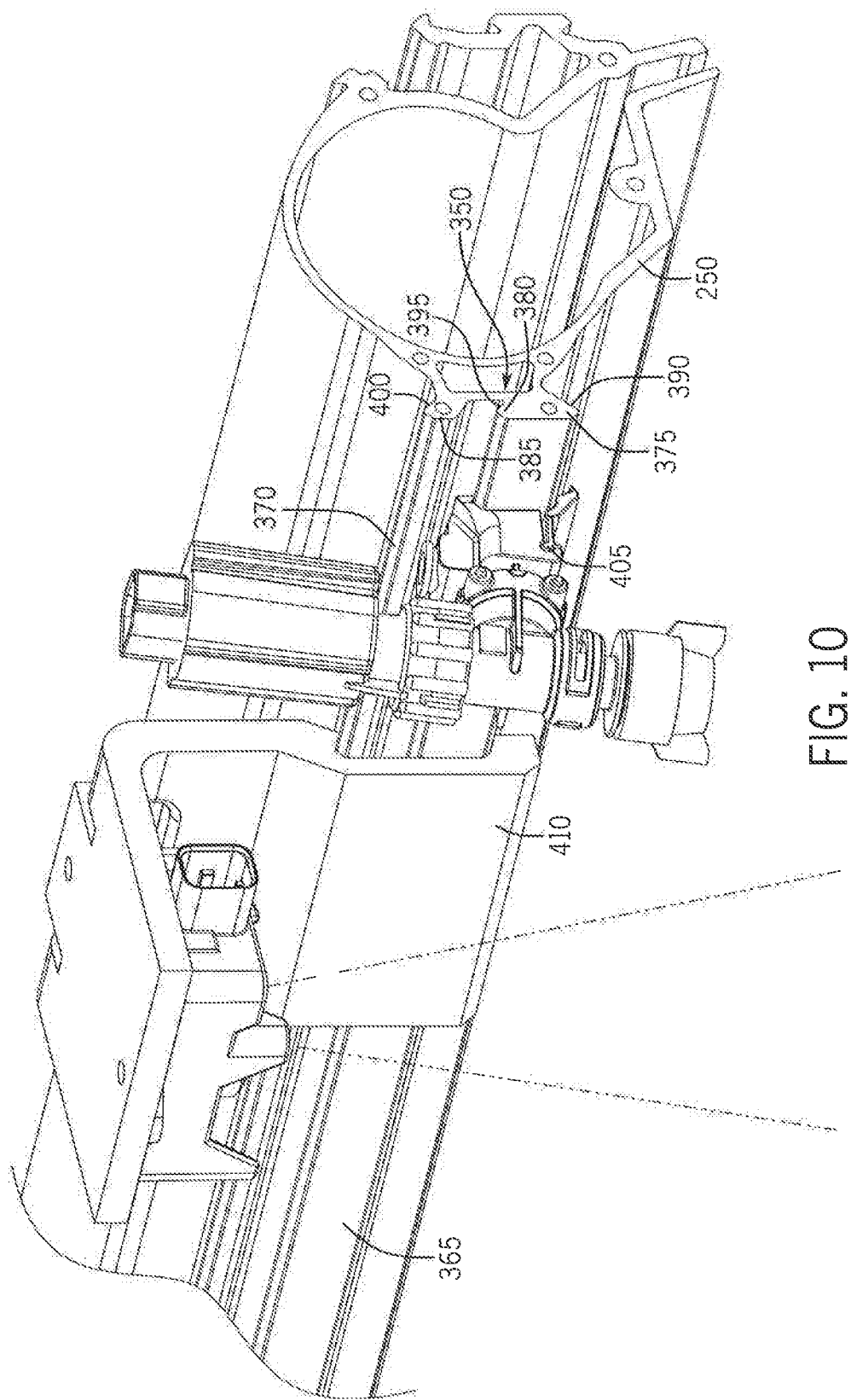
FIG. 10 is another enlarged isometric view of a boom arni having a plurality of accessories mounted to the rear of the left boom arm.

While the detailed construction shown in FIG. 7 has the first and second extrusions 180 and 185 mounted to the longitudinal tube 175, it is envisioned that the chase and/or mount can be integral to the boom structure. For example, FIGS. 9 and 10 show a longitudinal tube 250 formed of a unitary piece with multiple rails or mounts and a channel. For example, the longitudinal tube 250 can he formed of plastic or made of metal. If the chase is integral to the boom structure, like part of an aluminum extrusion, cost of assembly including time can be reduced. With an adequate number of ports, most all conceivable nozzle configurations can be accounted for, factor or field. Further, the first extrusion 180, or the integral chase, can include channels for pipes delivering agricultural product and/or air lines in conjunction with the control lines. Also, the first extrusion 180 (best shown in FIG. 6) as shown includes a drainage aperture 240 for liquid to drain from the channel 210.

Figure 8:
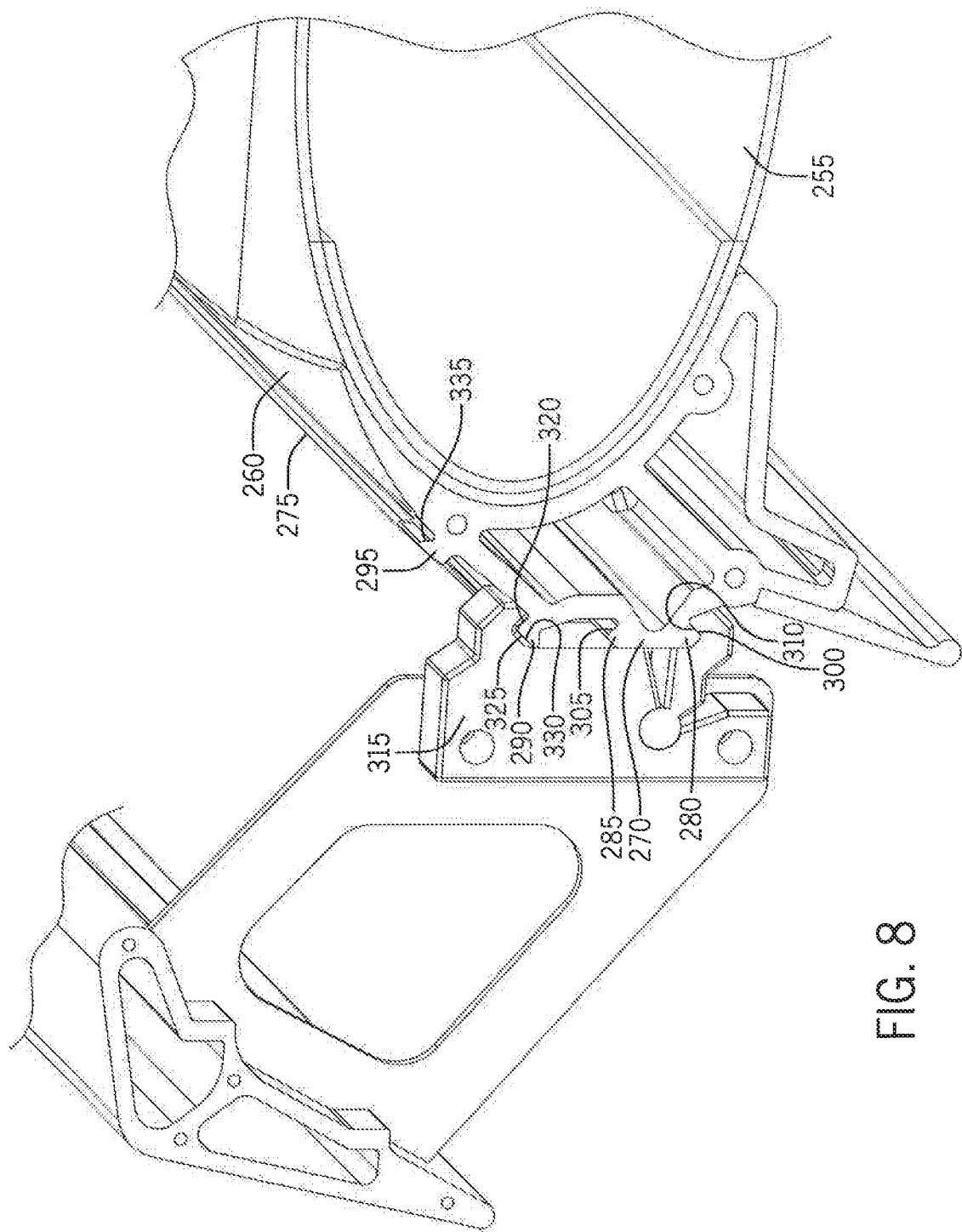
FIG. 8 is an enlarged isometric view similar to FIG. 5 showing a nozzle protection shield mounted to the left boom arm.

FIGS. 8-10 show different arrangements for mounting accessories to a boom arm. With reference to FIG. 8, a longitudinal tube 255 is shown with an extrusion 260. The extrusion 260 includes a longitudinal mount 265 along the longitudinal length of the extrusion 260. The longitudinal mount 265 includes multiple rails 270 and 275. The rails includes, and more broadly the longitudinal mount 265 has, a plurality of projections. More specifically, the longitudinal mount 265 has four projections 280, 285, 290, and 295. The projections 280 and 285, which are part of rail 270, have first and second lips, 300 and 305, respectively. Each lip, e.g., lip 300, has a projecting edge, which may be beveled, angular, or convex, for helping to retain a diametrically opposed shape of a fastener. For example, lip 300 receives an opposed indentation 310 of the clamp 315. The projection 285 can receive a second portion of a clamp in tandem with the projection 280. For example, FIG. 6 shows the clamp 195 fastened to the first rail 190 having projections analogous to projections 280 and 285. While clamps are shown in the drawings, other fasteners can be used in place of the clamps.

Referring back to FIG. 8 and projection 290, the projection 290 has multiple lips 320 and 325. The first lip 320 can also receive a second portion of the clamp 315 in tandem with the projection 280. As shown in FIG. 8, clamp 315 includes a second indentation 330 that receives the first lip 320. Lips 300 and 320 work with indentations 310 and 330 of clamp 315 to attach a nozzle shield. The nozzle shield protects nozzles (e.g., nozzle 67) of the application system 55 from being accidently struck during movement through a field. The second lip 325 and a lip 335 of projection 295 can be used to receive fasteners of other accessories of the application system 55 or boom arm 90.

FIG. 9 shows a longitudinal tube 250 and a plurality of longitudinal mounts 345 and 350 formed as a unitary piece. The first longitudinal mount 345 is similar in design to the extrusion 260. The discussion above for the extrusion 260 and its rails, projections, and lips apply equally to the first longitudinal mount 345 of FIG. 9. Clamps 355 and 360 are shown coupling to the first longitudinal mount in FIG. 9.

The second longitudinal mount 350 (shown in FIG. 10) includes multiple rails, including a first rail 365 and a second rail 370. The second longitudinal mount 350 has three projections 375, 380, and 385, each having a respective lip 390, 395, and 400. Each lip has a projecting edge, which may be beveled, angular, or convex, for helping to retain a diametrically opposed shape of a clamp. For example, FIG. 10 shows clamps 405 and 410 mounted to the second longitudinal mount 350.

With reference to FIG. 10, the bottom lip 390 and the first top lip 395 can receive a clamp 405 of a first size. The bottom lip 390 and the second top lip 400 receives the second clamp 410 of a second size. Multiple lip projections, such as described in FIG. 8, can be further included for even more robustness. By allowing different fastener sizes, different attachment styles and considerations (for example weight) can be accounted for with attachment to the boom arm.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

I claim:

1. An agricultural vehicle comprising:
a chassis;
wheels supporting the chassis for moving the vehicle;
an application boom coupled to the chassis and configured to deliver agricultural product to an agricultural field, the application boom having a boom arm including a longitudinal mount, the longitudinal mount including a first projection, a second multi-lip projection, and a third projection, the second multi-lip projection having a first lip and a second lip;
a first attachment having first and second fastener portions, the first attachment being fastened to the first projection and the first lip via the first and second fastener portions, the first projection and the first lip being at least partially received between the first and second fastener portions when the first attachment is fastened to the first projection and the first lip; and
a second attachment fastened to the second lip and the third projection.

2. The agricultural vehicle of claim 1, and further comprising an application system including
a product tank supported by the chassis and storing a volume of the agricultural product for delivery onto the agricultural field,
a nozzle body mounted to the longitudinal mount, and
a piping system for delivering the agricultural product to the nozzle body.

3. The agricultural vehicle of claim 2, wherein the nozzle body is mounted to the first projection and a fourth projection.

4. The agricultural vehicle of claim 1, wherein the application boom includes a longitudinal truss member, and wherein the longitudinal truss member includes the longitudinal mount.

5. The agricultural vehicle of claim 1, wherein the application boom includes a longitudinal truss member and a longitudinal extrusion member, and wherein the longitudinal extrusion member includes the longitudinal mount.

6. The agricultural vehicle of claim 1, wherein the first fastener portion has a first opposed surface opposed to a portion of the first projection and the second fastener portion has a second opposed surface opposed to a portion of the first lip, and the second attachment has a third opposed surface opposed to a portion of the third projection and a fourth opposed surface opposed to a portion of the second lip.

7. The agricultural vehicle of claim 1, wherein the first attachment comprises at least one of a nozzle clamp, radar unit, sonic sensor, smart sensor, or camera.

8. The agricultural vehicle of claim 6, wherein the first attachment is a clamp, the first opposed surface being part of an indentation of the first fastener portion and the second opposed surface being part of an indentation of the second fastener portion.

9. The agricultural vehicle of claim 3, wherein the nozzle body comprises a clamp, the first projection and the fourth projection being at least partially received between fastener portions of the nozzle body when the nozzle body is mounted to the first projection and the fourth projection.

10. The agricultural vehicle of claim 3, wherein the fourth projection is at least partially received between the first and second fastener portions when the first attachment is fastened to the first projection and the first lip.

* * * * *